United States Patent [19]

Aldrich

[11] Patent Number: 4,506,449
[45] Date of Patent: Mar. 26, 1985

[54] ROCKER CLIP ASSEMBLY

[75] Inventor: Roger Aldrich, Grand Island, Nebr.

[73] Assignee: Chief Industries, Inc., Grand Island, Nebr.

[21] Appl. No.: 410,148

[22] Filed: Aug. 23, 1982

[51] Int. Cl.$^3$ .................... G01B 5/25; G01B 11/27
[52] U.S. Cl. .................... 33/288; 33/180 AT
[58] Field of Search ........... 33/180 AT, 181 AT, 191, 33/203.18, 203.19, 203.20, 264, 288

[56]  References Cited

U.S. PATENT DOCUMENTS

| 2,581,021 | 1/1952 | Jacobsen et al. | 33/288 |
| 2,798,296 | 7/1957 | Liskey | 33/288 |
| 3,611,575 | 10/1971 | Chartier | 33/288 |
| 3,869,804 | 3/1975 | Friend | 33/288 |
| 4,006,532 | 2/1977 | Hallman | 33/288 |
| 4,015,338 | 4/1977 | Kunze et al. | 33/288 |
| 4,193,203 | 3/1980 | LeGrand et al. | 33/180 AT |
| 4,330,945 | 5/1982 | Eck | 33/288 |

FOREIGN PATENT DOCUMENTS 138647  8/1949  Australia ..................... 33/180 AT Primary Examiner—Richard R. Stearns
Attorney, Agent, or Firm—Head, Johnson & Stevenson

[57] ABSTRACT

A self-centering alignment gauge for determining automotive frame and body structure alignment has a clip to permit hanging such gauges outside of the vehicle body, from the top surface of the rocker panel.

1 Claim, 17 Drawing Figures 4,506,449

ROCKER CLIP ASSEMBLY

CROSS REFERENCE TO RELATED PATENT

This patent is related to the U.S. Pat. No. 3,888,100 of Mr. Finis L. Chisum. U.S. Pat. No. 3,888,100 has been entered by reference into this application.

BACKGROUND OF THE INVENTION

1. Field of the Invention

This invention relates to an improvement in the design of self center alignment gauges, which are used to determine when the frame or body structure of a car or truck or other motor vehicle has been damaged in a collision so as to distort the frame or body structure. These self centering alignment gauges are normally hung from the outside or inside, top or bottom edges of the longitudinal rails of the frame of the vehicle. They have a means which is self centering on the gauge, so that a sighting point is provided with is along the center line of the frame. This invention provides a much simplified method of supporting the gauges from the outside of the body by hanging them from the rocker panels which are readily avaiable.

2. Description of the Prior Art

In the prior art there are a number of precision self centering alignment gauges on the market. One of these is manufactured by the Arn-Wood Company, Inc., 2360 West Bates Avenue, Inglewood, Colo., 80110.

These gauges are precision sighting gauges. However, they must be supported from corresponding points on each side of the frame of the vehicle.

Hanging the gauge below the frame is a difficult and laborious process, particularly when it must avoid and be below all of the material and fixtures under the car, and in and around the frame, except of course the wheels.

It is well known that if a part of the frame has not been damaged, and the body is likewise undamaged, then it is possible to support the gauges from the body. This has generally been done by hanging the gauges from corresponding parts of the under portion of the body or supporting the gauges from holes drilled in the side of the body. Because of these difficulties, this invention has been developed to provide a much more convenient method of rapid attachment and detachment of the gauges to the body in rigid assembly for the purpose of reading the vehicle center line, level or (parallel condition) and datum.

SUMMARY OF THE INVENTION

It is a primary object of this invention to provide a method of precise attachment of self centering alignment gauges from outer portions of the body structure. This method of support obviates the need to either drill holes or clean the under portion of the body for good magnetic contact to support the gauges.

The need for such an attachment arrives from the growing number of unitized vehicles now being repaired, as opposed to the conventional frame vehicle. The unitized vehicle has no frame rail through the center section of the vehicle. The rocker then becomes the major component that supports the vehicle body structure. It is also the starting place from which all body alignment must start and more specifically, the top surface of such rocker. It is therefore necessary for alignment gauges to hang from this precise location.

The two rockers designate and establish the center section of the vehicle. This established center section is the base for all gauging. Gauging is initiated by hanging a gauge at either end of the center section. These are considered the base gauges. Other gauges are attached at the ends of the vehicle and read into the base gauges to determine their positions relative to the base gauges.

It will be found in many unitized bodies that regardless of how the gauges are mounted, they must be referenced to the top surface of the rocker. It is the purpose of this clip to perform this easily.

The same principle of gauging can be applied to the body of a vehicle with a frame. In this application, the gauges would only be reading the body structure for alignment and not the frame.

One major improvement in the fixture allows the attachment to hang on the top surface of the rocker, regardless of its configuration and still allow the door to open freely without interference.

The improvement lies in a fixture which can be rapidly attached and detached from upwardly extending columns from the horizontal gauge arms. The gauges comprise two arms which are parallel and extend past each other. They are held in contact with each other through rollers, such that when the outer ends of these two bars or arms are pulled apart the roller mechanism assembly stays always in the center, between the two ends of these arms. Consequently, when the ends are hung from corresponding points on the outside or the inside of the top or from the bottom of the members of the frame, that central portion carrying a sighting means, will be along the center line of the frame.

The invention lies in the form of a small assembly which is adapted to be attached by spring pressure, to the top of the columns extending from the ends of the horizontal arms of the gauge. These upwardly extending columns are generally rigid metal straps which are marked off in inches so that the two columns, and fixtures, are symmetrically arranged on the gauge.

The fixture comprises a body and an arm member which extends horizontally in the plane of the gauge. It can be tilted upwardly from the horizontal so as to fit the slope and contour of the top surface of the rocker panel. Each car has its own design of the rocker panel which, incidentally, is the part that provides the door step and continues the body, curving downwardly and inwardy to the bottom of the body. By tilting this arm to the angle corresponding to the top surface of the rocker panel, the gauge can be supported symmetrically with respect to the body. This can be done very quickly and simply and all that is necessary is to ensure that the gauge hangs horizontally from the corresponding suspension points.

In the process of straightening a damaged or misaligned frame or body structure, the damaged or misaligned area must be realigned to corresond to the remaining body structure. Two gauges are mounted at the ends of the center section, dividing the vehicle into three sections. This can be accomplished by hanging the gauges from the outside of the body. The most available part is the top of the rocker panels, and this fixture makes it possible quickly and simply, to set the gauge and hang it from these rocker panels.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1A:
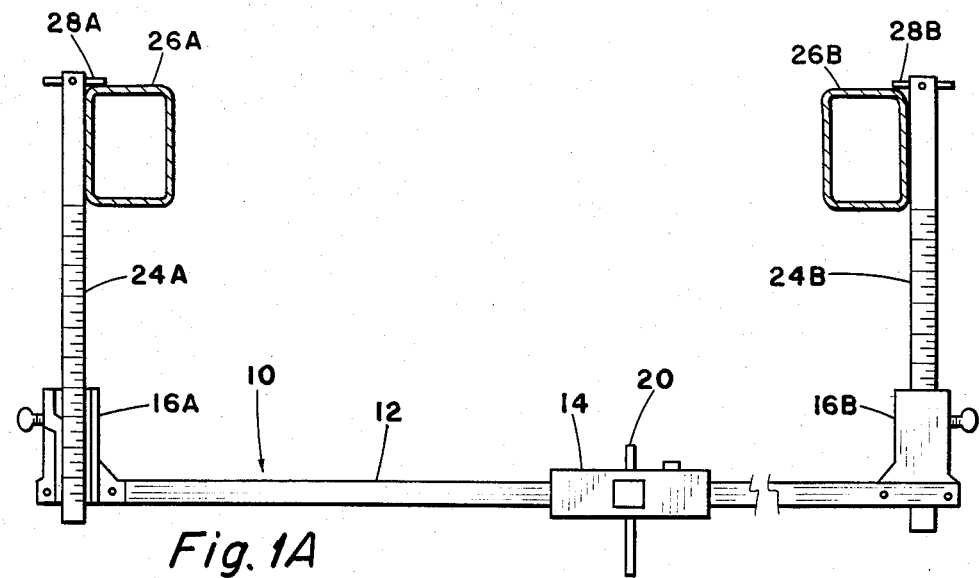
FIGS. 1A, 1B, 1C, 1D, 1E, 1F, and 1G are illustrations of the prior art as to the manner of utilizing a conventional precision chassis gauge.
Figure 1B:
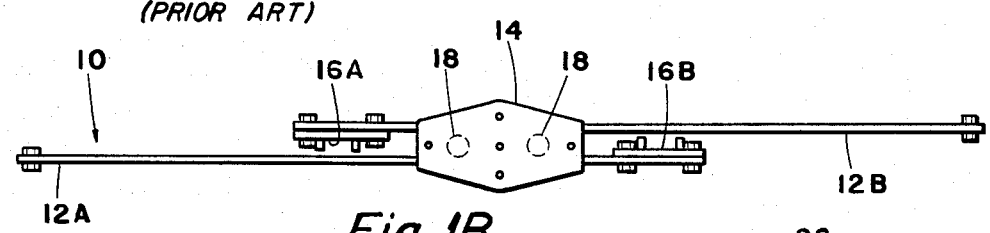

Referring now to the drawings and in particular to FIGS. 1A and 1B there are shown two views of one type of commercial precision self centering alignment gauge indicated generally by the numeral 10. It will be described in some detail, but it is to be understood that this invention is not limited to this type of chasis gauge and that this particular model is only being described for convenience, and not by way of limitation.

The gauge itself comprises two horizontal bars 12A and 12B which are held in contact with a pair of flanged rollers 18 so that as the arms 12A and 12B are pulled apart, the center structure 14 will stay precisely in the center, between the two ends of the cross bars. The central structure 14 as shown in FIG. 1A carries various types of sighting means, such as a central pin 20, that marks the center line between the two ends of the gauge.

At the outer ends of these bars 12A and 12B, there are two fixtures 16A and 16B which are held by screws. In turn these fixtures 16A and 16B hold vertical columns 24A and 24B which are rigid flat bars of aluminum. Normally these are marked in linear dimension, so that the dimensions from the point 28A and 28B, which are supported by the longitudinal frame members 26A and 26B, will be the same and the cross bars 12 will then lie in a horizontal plane. It will be clear that the columns 24A and 24B can be set precisely perpendicular to the bars 12 so that when the upper ends of the columns are pressed tightly to the outside, or to the inside, of the frame member 26 that the sighting point 20 will be precisely in the middle of the space between the two longitudinal frame members.

Figure 1C:
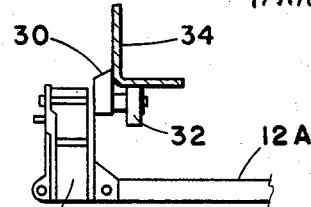
Figure 1D:
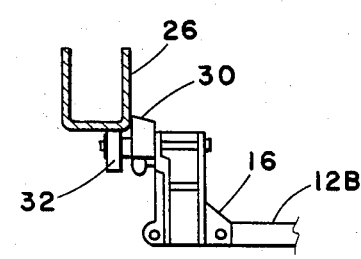

FIG. 1A shows how the gauge can be supported by the pin 28A and 28B from the outside edges or from the inside top edges of the frame. FIGS. 1C and 1D illustrate how, with a different type of fixture 16 a magnet 32, supported by fixture 16, will attach itself to the bottom surface of the frame 26 or to the lower plate 34 of a different style of frame construction. The precise corner of the frame 26 is positioned against gauge 30 above magnet 32.

Figure 1E:
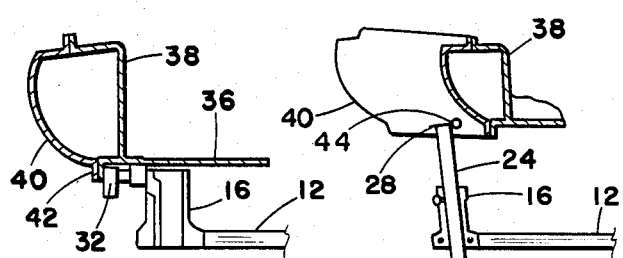
Figure 1G:
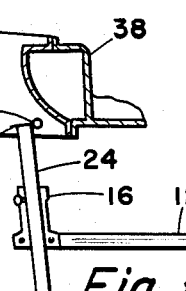
Figure 1F:
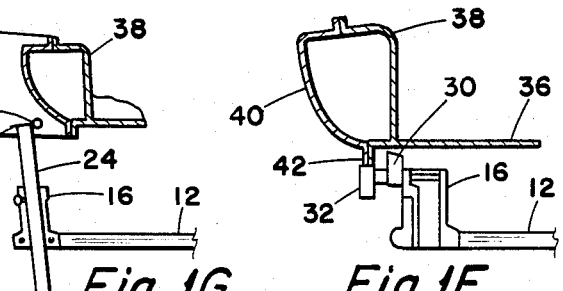

Referring to FIGS. 1E and 1F, there are shown methods by which a gauge arm 12 can be supported by magnets attached to the fixture 16 where the magnet hangs from the bottom of the floor plate 36, as in FIG. 1E, or from the bottom edge of the flange 42 where the bottom plate 36 joins the rocker panel 40.

FIG. 1G illustrates another method of supporting the gauge and that is to drill a small hole 44 through the bottom flange of the rocker panel and support the gauge by means of the pin 28 in the column 24.

These seven prior art figures are illustrated to provide background for this invention. They point out that with a conventional basic self centering alignment gauge as shown in FIGS. 1A and 1B and other minor features such as the support pins 28A and 28B or the support magnets 32 for example, the gauges can be hung from the frame or body structure either on the outside edges or the inside edges, from either the top or the bottom. However, the capability of getting a gauge hanging below the floor of the car with the upright columns 24A and 24B passing upwardly through the maze of cables, pipes, and cross braces that are always present, is a rather difficult problem.

Regardless of damage, two base gauges must always be installed. In the case of a unitized body vehicle which has no frame, it is sometimes imperative that gauging relate to the body. In the case of a frame vehicle with body structure misalignment, it is again imperative to relate gauging to the body structure. Thus, the tops of the rocker panel are useful and necessary surfaces from which to support the gauges. So far, in the prior art there has been no indication of such devices and the present invention lies in a simple fixture that can be rapidly applied to the gauge, to permit hanging the gauge from the outside of the body and below the frame.

Figure 2A:
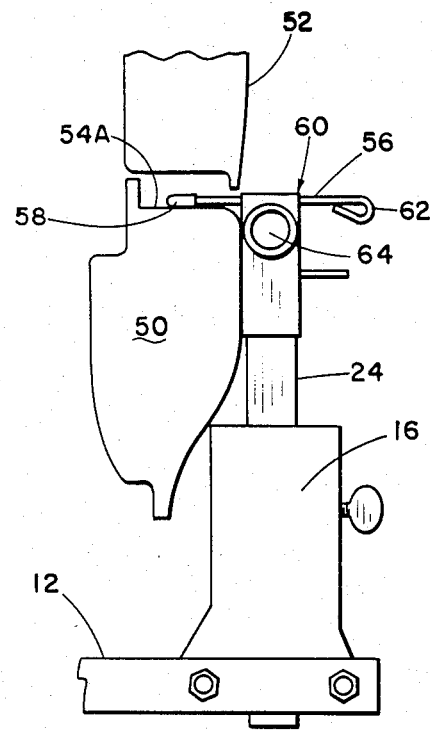
FIGS. 2A, 2B, 2C and 2D illustrate the manner in which the improvement of this invention modifies the manner in which the chassis gauge is used in order to speed and simplify the operation.
Figure 2B:
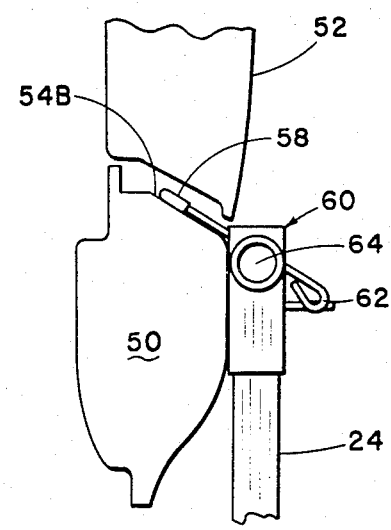

Referring now to FIGS. 2A, 2B and 2C and 2D, there are illustrated four possible cross sections of the side of a body showing the rocker panel 50, the floor of the door step 54A and the door 52. Some of the contours of these door steps are quite different as shown, for example in FIGS. 2A, 2B, 2C and 2D. Some are horizontal, some are flat or at an angle, some have odd shapes with only a small portion flat enough to support the gauge. The cross bar 12 of FIG. 2A represents the cross bar shown in FIG. 1A, and the fixture 16 is similar to FIG. 1A. The novelty lies in the clip assembly 60, that is attached to the column 24.

As will be explained in more detail in FIG. 3A, a small arm 56 made of small diameter rod of selected length is carried by the clip 60. One end of the arm 56, namely the support end 58, has a thin coating or covering of selected material, to be the point of support for that end of the gauge. The other end 62 is bent in any desired manner to form a handle for the arm. As will be shown in FIGS. 3A, 3B, 3C and 3D, the arm can be tilted to a number of different fixed angles from the point where the support point is horizontal or where it is raised to a selected angle to match that of the door step 54B as in FIG. 2B.

Figure 2C:
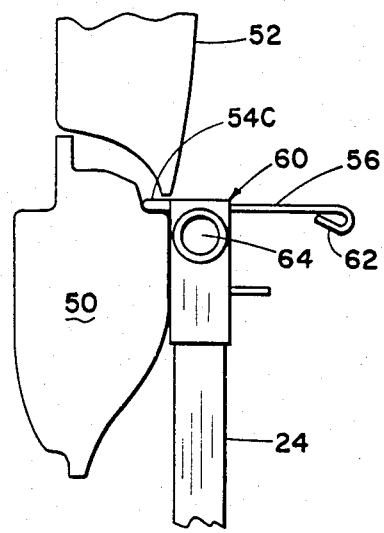
Figure 2D:
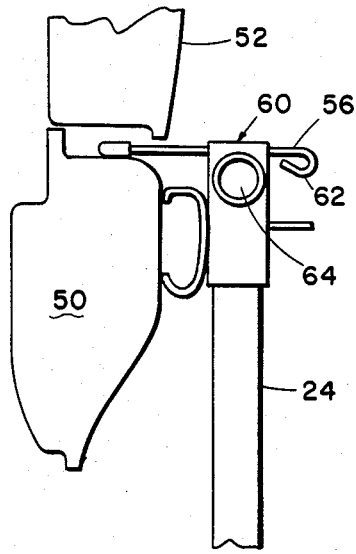

Again, in FIG. 2C the gauge is hung from a short horizontal shelf portion 54C of the door step, with the column 24 close up against the outer wall of the rocker panel The length of the arm 56 is such as to permit reaching far in from the outside as in FIG. 2A or on the outer edge as in FIG. 2C. Also, if there were a molding along the rocker panel which was on the outside of the rocker panel, then the column 24 would have to be moved outwardly, and the arm then must be long enough to reach in as in FIG. 2D even with an obstruction on the outside of the rocker panel.

As shown in FIGS. 2A, 2B, 2C, and 2D the invention is a clip or fixture 60 which can be attached quickly and easily to the column 24 which is supported by the gauge arms 12 in the clamps 16. The fixture 60 includes an arm which can be extended inwardly or outwardly from the fixture and can be positioned through a selected angle to lie along the upper surface of the rocker panel, so that the sighting gauge can be supported by this short arm which rests on the top of the rocker panel.

Of course, this fixture can be made in a number of ways, however, it will be described in terms of one embodiment which has been proved to be simple and inexpensive and very convenient to use.

Figure 3B:
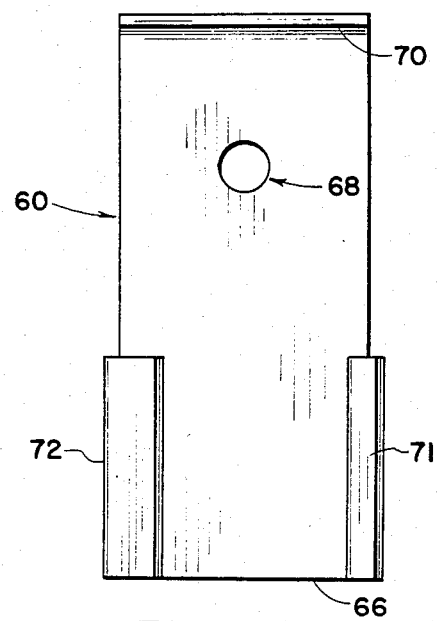
FIGS. 3A, 3B, 3C and 3D illustrate the construction of the improvement of this invention.

There are a number of views of this device in FIGS. 3A, 3B, 3C and 3D. The main body portion is illustrated in FIG. 3B; this consists of a plane strip 66 with an opening 68 for attachment of a block 74 shown in FIG. 3A. The upper end of the strip forms a bend 70 to contain the arm 56 between the top of the block 74 and the bend portion 70. This arrangement is what allows minimum clearance for opening and closing of a door. The lower end of the strip has two side flanges 71 and 72 which are adapted by spring pressure to hold the fixture to a rectangular column 24 of the shape 70. This spring pressure is, of course, sufficient to hold the fixture rigidly to the column but also weak enough so that the fixture can be positioned quickly and easily on the column.

Figure 3A:
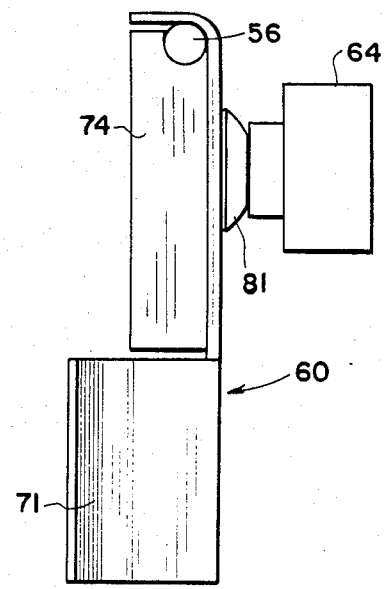
Figure 3C:
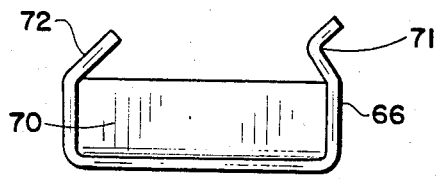
Figure 3D:
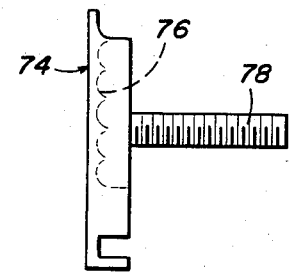

FIG. 3A shows the position of the arm 56 which is made from a selected length of small diameter rod. The support end 58 is covered with a thin layer of suitable material such as by dipping or painting or attachment of a thin wall tube. The principal purpose of this is to provide friction between the arm 56 and the surface 54 on which it rests. The other end of the arm 56 is bent in any desired way to provide a handle 62 for the arm, so that it can be positioned properly in the fixture prior to or anytime while the gauge is hanging. A part 74 is shown in FIG. 3D, this can either be a block of metal which is milled with a plurality of grooves at different angles such that the arm 56 can be fitted into one or another of the grooves, and be held tightly in position against the strip 66. Another way of building this part 74 is to use thin sheet metal and bend up the walls to form a shallow cup. One of the bent up edges will be cut with serrations 76, so that while the arm is held in a corner as shown in FIG. 3A, the other stem portion 56 of the arm can be locked into one or the other of these serrations so that the arm will be held at a desired angle to the horizontal. The block, or fabricated part 74 of FIG. 3D can be held by screw means through the opening 68 and nut 64 to the fixture body 66. The screw member is provided with a spring washer 81 which when adjusted to the correct tension, will allow adjustment of the arm through the notches without changing adjusting nut. It is, of course, convenient to have the screw member 78 fastened to the block 74 so that the block can be loosened or removed very simply and quickly.

While there are other ways of manufacturing the fixture 60, the essential features are a body; (a) a means to removably attach the fixture body to the column, and means to clamp a support arm to the body at a selected angle from the horizontal to a sloping position.

Figure 4B:
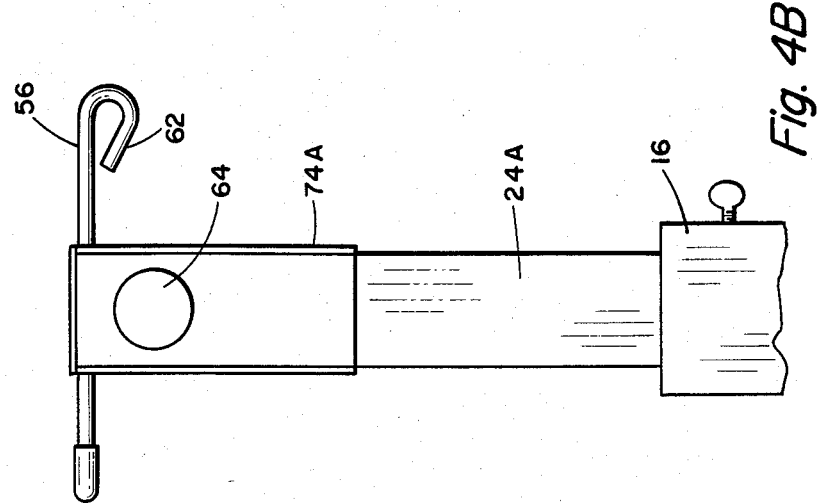
FIGS. 4A and 4B illustrate a second embodiment of the improvement of this invention.
Figure 4A:
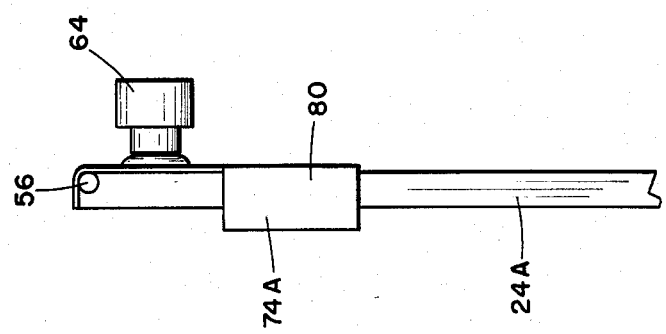

FIGS. 4A and 4B illustrate another embodiment of the clip or fixture 60. The embodiment is similar in general to FIG. 3A. However, instead of being a self-contained fixture adapted to be positioned on the top of the supporting column 24, it is constructed on the top of a flat bar 24A of dimension similar to that of the column 24. This makes it possible to insert the bar 24A into, and clamp it to the clamp 16 on the end of the crossbar 12 of the gauge 10.

A plate or part 74A, similar to the part 74 of FIGS. 3A and 3D is provided, that can hold the support arm 56, at a selected angle between the block 74 and the bar 24A, and which can be clamped by means such as the screw 78 and nut 64.

The block 74A is positioned by a hole drilled near the end of the bar, and is prevented from turning, as the nut 64 is tightened, by wide side walls 80, which fit snugly to the edges of the rod 74A.

What has been described is an improved method of supporting a self centering alignment gauge positioned below the frame and body of a vehicle from corresponding points on the outside of the body, and an apparatus for accomplishing this method.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification but is to be limited only by the scope of the attached claim or claims, including the full range of equivalency to which each element thereof is entitled.

What is claimed is:

1. In apparatus for measuring alignment of vehicle chassis rocker arm panels, especially where said panels are located beneath doors of said vehicle, an alignment gauge of the type having at least one horizontal crossbar and visible alignment measuring indicia means, said alignment gauge supportable, on vertical columns, transversely below the travel direction axis of said vehicle, means to support said vehicle columns upon said rocker arms beneath said door comprising:

a fixture attached to the top of each of said vertical columns; a support arm adjustably affixed to the top of each said fixture, one end of said support arm extendable therefrom to rest on said rocker arm panels, said fixture further comprising:

a flat bar means of dimensions similar to those of said column;

plate means having groove means for holding said support arm in a selected angle;

means to hold said plate means tightly to said flat bar means, thereby clamping said support arm therebetween; and means to attach said flat bar means to the top of said vertical column.

* * * * *